(12) United States Patent
Barnes

(10) Patent No.: US 12,496,024 B2
(45) Date of Patent: Dec. 16, 2025

(54) DIGITAL MOBILE RADIOGRAPHY SYSTEMS AND METHODS

(71) Applicant: Rad Physics, Inc., Birmingham, AL (US)

(72) Inventor: Gary T. Barnes, Vestavia Hills, AL (US)

(73) Assignee: Rad Physics, Inc., Birmingham, AL (US)

( * ) Notice: Subject to any disclaimer, the term of this patent is extended or adjusted under 35 U.S.C. 154(b) by 218 days.

(21) Appl. No.: 18/520,857

(22) Filed: Nov. 28, 2023

(65) Prior Publication Data

US 2025/0169777 A1    May 29, 2025

(51) Int. Cl.

| | |
|---|---|
| *A61B 6/04* | (2006.01) |
| *A61B 6/00* | (2006.01) |
| *A61B 6/06* | (2006.01) |
| *A61B 6/42* | (2024.01) |
| *A61B 6/58* | (2024.01) |

(52) U.S. Cl.
CPC .......... *A61B 6/4405* (2013.01); *A61B 6/0492* (2013.01); *A61B 6/06* (2013.01); *A61B 6/4291* (2013.01); *A61B 6/4458* (2013.01); *A61B 6/542* (2013.01); *A61B 6/587* (2013.01); *A61B 6/588* (2013.01)

(58) Field of Classification Search
CPC ... A61B 6/0492; A61B 6/4405; A61B 6/4458; A61B 6/587; A61B 6/4452; A61B 6/08; A61B 6/4021; A61B 6/06; A61B 6/4291; A61B 6/542; A61B 6/588; G21K 1/025

See application file for complete search history.

(56) References Cited

U.S. PATENT DOCUMENTS

| | | |
|---|---|---|
| 6,422,750 B1 | 7/2002 | Kwasnick et al. |
| 6,702,459 B2 | 3/2004 | Barnes et al. |
| 7,156,553 B2 | 1/2007 | Tanaka et al. |
| | (Continued) | |

FOREIGN PATENT DOCUMENTS

JP    2020089131 A1    6/2020

*Primary Examiner* — Don K Wong
(74) *Attorney, Agent, or Firm* — Dennen IP Law, LLC

(57) ABSTRACT

A mobile radiography system of the present disclosure has an x-ray source assembly that activates a digital x-ray detector through X-rays striking the digital x-ray detector and a test plate in a stream of the X-rays configured to image a test pattern onto the digital x-ray detector. Further, the mobile radiography system has a processor that receives data indicative of the test pattern and the anatomy of interest and generates a first image based upon the data indicative of the test pattern and the anatomy of interest. Further, the processor analyzes the first image and determines if a focal spot of the x-ray source assembly is aligned with a focal axis of an anti-scatter grid and the digital x-ray detector. When the focal spot of the x-ray source assembly is misaligned with the focal axis of the anti-scatter grid and center of the digital x-ray detector, the processor further aligns the focal spot of the x-ray source assembly with the focal axis of the anti-scatter grid and the center of the digital x-ray detector or the instructs an operator for manually aligning the focal spot of the x-ray source assembly with the focal axis of the anti-scatter grid and the center of the digital x-ray detector.

38 Claims, 10 Drawing Sheets

(56) References Cited

U.S. PATENT DOCUMENTS

| | | |
|---|---|---|
| 7,341,376 B2 | 3/2008 | Birdwell |
| 7,581,884 B1 * | 9/2009 | Barnes .................... A61B 6/06 |
| | | 378/205 |
| 7,798,710 B1 | 9/2010 | Barnes et al. |
| 8,821,015 B2 | 9/2014 | Stagnitto et al. |
| 8,827,554 B2 | 9/2014 | Lalena et al. |
| 9,155,509 B2 | 10/2015 | Lalena et al. |
| 9,179,866 B2 | 11/2015 | Khuon et al. |
| 10,016,173 B2 | 7/2018 | Foos et al. |
| 10,165,992 B2 | 1/2019 | Wang et al. |
| 10,383,203 B2 | 8/2019 | Meiler et al. |
| 10,463,325 B2 | 11/2019 | Foos et al. |
| 10,531,850 B2 | 1/2020 | Tkaczyk et al. |
| 10,653,385 B2 | 5/2020 | Mehendale et al. |
| 10,758,204 B2 | 9/2020 | Grondin et al. |
| 10,779,791 B2 | 9/2020 | Tkaczyk et al. |
| 2022/0133251 A1 | 5/2022 | Richard et al. |

* cited by examiner

DIGITAL MOBILE RADIOGRAPHY SYSTEMS AND METHODS

BACKGROUND

A digital mobile radiography unit consists of a planar digital image detector, computer and display, x-ray source, manual x-ray beam collimator, x-ray generator and control, and supporting mobile assembly. A mobile radiographic exam consists of the operator moving the unit to the patient's bedside. The operator then positions the planar digital image detector beneath the anatomy of interest and the x-ray source above the anatomy of interest and visually aligns the source with the image detector. The operator also visually adjusts the x-ray beam collimation.

The operator selects the x-ray tube potential (kV) for the type of exam and the x-ray tube current-exposure time product (mAs) and initiates the x-ray exposure. The x-ray image is captured by the digital image detector and communicated wirelessly to the unit's computer, processed, and displayed for viewing by the operator. When an anti-scatter grid is used it is placed on the digital image detector prior to positioning the detector (and grid) beneath the anatomy of interest.

The detected x-ray image consists of two classes of X-rays, primary and secondary. The primary X-rays have travelled in the straight-line path from the x-ray tube focal spot, passing through the patient, to the image detector and carry anatomical information. Secondary X-rays have interacted with atoms and electrons in the patient, are scattered, and do not travel in a straight line from the focal spot to the image detector and carry no information. The secondary or scattered X-rays form an out-of-focus image superimposed on and degrading the quality of the primary x-ray image. An anti-scatter grid is a device that reduces the amount of scattered radiation reaching the detector. The operator positions the anti-scatter grid on the opposite side of the patient from the x-ray source and between the patient and the x-ray detector. The anti-scatter grid reduces the contribution of the secondary out-of-focus scattered X-rays and increases the image's contrast resolution, and consequently, the visibility of anatomical structures.

A grid consists of an array of radiopaque foil strips (usually lead) separated by strips of radiolucent interspace material (usually aluminum or fiber). Commonly used anti-scatter grids have their strips progressively tilted with increasing distance from the center of the anti-scatter grid and focused on a line above the center of the anti-scatter grid (grid focal axis). When the anti-scatter grid is properly positioned and aligned between the patient and image detector, the x-ray tube focal spot is on the focal axis of the anti-scatter grid, the anti-scatter grid is aligned, and the image-forming primary X-rays "see" only the edges of the lead foil strips and small fraction are absorbed; whereas, the scattered X-rays "see" a much greater area of lead and a large fraction are absorbed. Higher ratio grids control scatter better than low ratio grids but require more precise alignment. When a grid is misaligned a greater percentage of the primary X-rays are absorbed by the grid, and often non-uniformly, then when the grid is aligned. Conversely, the percentage of scattered X-rays transmitted by the grid is minimally affected by its misalignment. When a grid is misaligned, the contribution of scattered X-rays to the detected x-ray image is increased and the quality of the detected x-ray image is degraded when compared with an image obtained when the anti-scatter grid is properly aligned.

When an anti-scatter grid is employed in mobile radiography, it is aligned visually with the x-ray tube focal spot and the alignment achieved is not precise. As a result, anti-scatter grids are not used in exams where the grid misalignment can mimic pathology. In exams where a modest anti-scatter grid misalignment does not mimic pathology, low ratio anti-scatter grids (6:1 or 8:1) are employed in which the misalignment effects are less than what occurs with a high ratio grid.

DESCRIPTION OF THE FIGURES

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure provides systems and methods to improve scatter control in digital mobile radiography with minimal effort by the operator. Improved scatter control is achieved with automated, rapid, and accurate alignment of a digital mobile radiographic unit's x-ray tube focal spot with a focal axis of an anti-scatter grid and a digital x-ray detector.

The present disclosure describes a digital mobile radiography unit with the features of an automatic x-ray beam collimation, high ratio ($\approx$12:1) anti-scatter grid, and x-ray focal spot-image detector location and orientation measuring. The digital mobile radiography unit tracks the location of each degree of freedom of the X-ray tube focal spot and, when directed, moves the x-ray tube focal spot so that the x-ray focal spot aligns with a focal axis of the anti-scatter grid and collimates the spatial extent of an x-ray beam to a digital x-ray detector. The spatial extent of the x-ray beam includes the length and the width of the primary x-ray beam incident on the patient and the digital x-ray detector.

Figure 1:
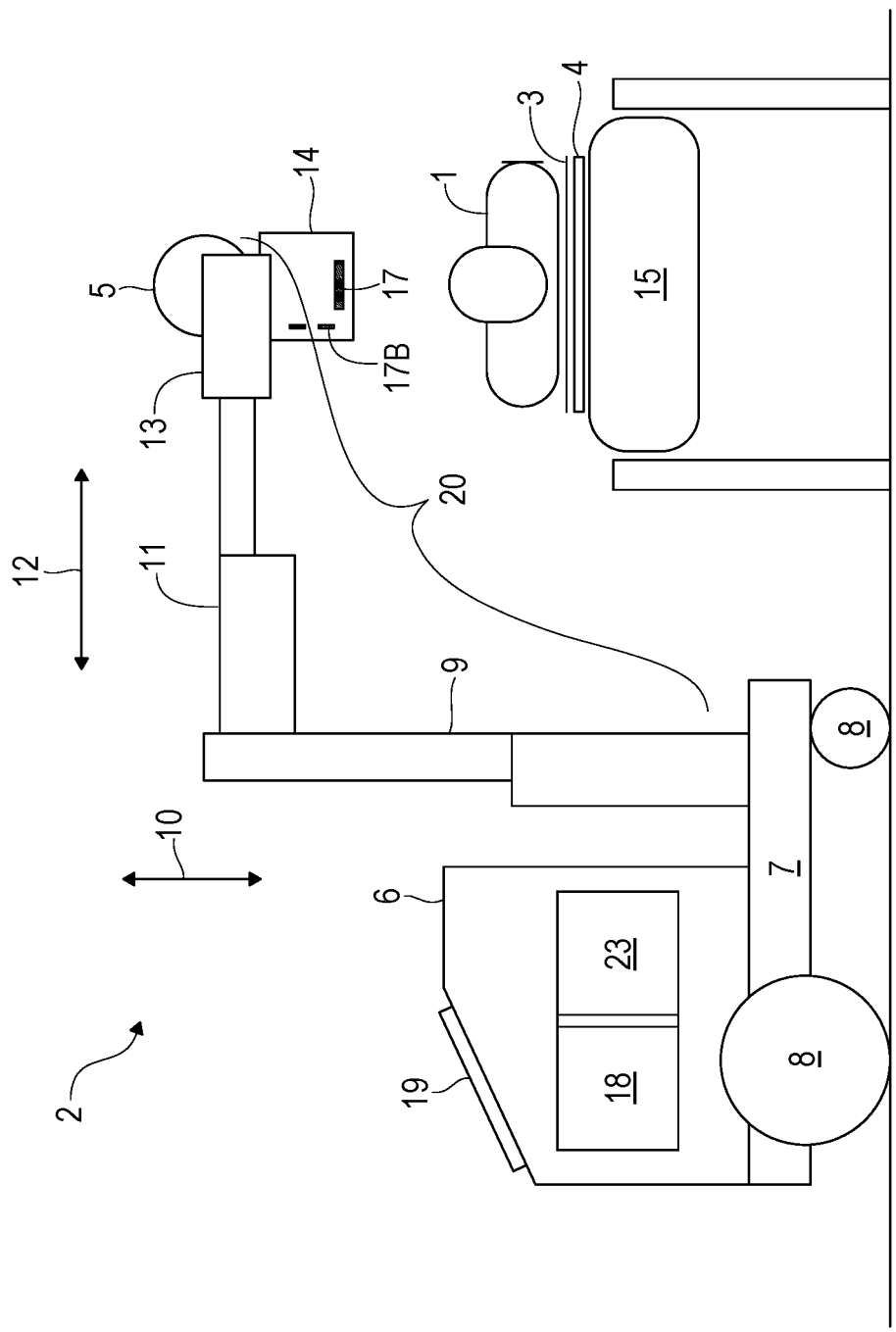
FIG. 1 is a diagram of an exemplary mobile radiography system in accordance with an embodiment of the present disclosure.

FIG. 1 is an exemplary mobile radiography system 2 in accordance with an embodiment of the present disclosure. The mobile radiography system 2 comprises a cabinet 6. The cabinet 6 houses a radiography computing device 18, an x-ray generator 23, and a display device 19. Note that in one embodiment there may be batteries (not shown) to power various components of the mobile radiography system 2.

The cabinet 6 is coupled to a base 7. Base 7 is coupled to one or more wheels 8 that allow the mobile radiography system 2 to be transported where needed in a medical facility for performing bedside radiography. The mobile radiography system 2 is transported using controls (not shown) by the operator (not shown) via motors (not shown) coupled to the one or more wheels 8.

The base 7 is coupled to an articulated arm 20. The articulated arm 20 comprises a vertical column 9. In one embodiment, the vertical column 9 is telescoping allowing movement in a vertical direction indicated by the double arrow 10.

Further, the articulated arm 20 comprises a horizontal arm 11. The horizontal arm 11 is coupled to the vertical column 9. In one embodiment, the horizontal arm 11 is telescoping allowing movement in a horizontal direction indicated by the double arrow 12. The articulated arm 20 further comprises a gimbal 13 and bracket (not shown) coupled to the horizontal arm 11 and gimbal 13. The bracket controls one or more degrees of motion freedom of the x-ray source assembly 5. The gimbal 13 is coupled to the x-ray source assembly 5 and controls one or more degrees of motion freedom of the x-ray source assembly 5. Also coupled to the x-ray source assembly 5 is a collimator 14. The collimator 14 is configured to spatially restrict the span of an X-ray beam emitted by the x-ray tube (not shown) contained in the x-ray source assembly 5. The collimator 14 is described with reference to FIG. 4. Moveably coupled within the collimator 14 is a test plate 17 in accordance with an embodiment of the present disclosure. The test plate 17 is further described with reference to FIG. 3.

In operation the anti-scatter grid 3 and the digital detector 4 are positioned beneath the patient's anatomy of interest. The articulated arm 20 is moved manually by the operator, and the x-ray source assembly 5 is positioned. Further, the collimator 14 is adjusted so that the x-ray beam (not shown) is directed at the patient 1 and patient's anatomy of interest. In one embodiment, the patient 1 is placed on a bed 15. A digital x-ray detector 4 is placed behind the patient 1 to capture an anatomical area of interest. In one embodiment, the digital x-ray detector 4 comprises a flat-panel two-dimensional active-sensor digital matrix detector array. The digital x-ray detector 4 is configured to convert images (not shown) captured to digital data in real-time so that the images are available for analysis within seconds via the display device 19. In this regard, images captured are wirelessly communicated to the radiography computing device 18, and the radiography computing device 18 displays the images to the display device 19. A focused anti-scatter grid 3 is placed between the digital x-ray detector 4 and the patient. The anti-scatter grid 3 limits the amount of scattered radiation reaching the digital x-ray detector 4, which improves the quality of diagnostic x-ray images. Reducing the scattered X-rays increases the final image's contrast resolution, and consequently the visibility of anatomy. In one embodiment, the anti-scatter grid 3 is a high ratio ($\approx$12:1) anti-scatter grid. The radiography computing device 18 monitors the movement of the articulated arm 20 and tracks the different degrees of motion freedom of the x-ray focal spot 26 and its location. In addition, the radiography computing device 18 determines the x-ray detector location and orientation relative to the x-ray focal spot 26 and central ray 28.

Further, the radiography computing device 18 tracks the collimator settings and x-ray beam dimensions. Through operator cues or automatically, the radiography computing device 18 moves the x-ray tube focal spot to a desired location.

The automatic collimator 14 allows for automatic or manual adjustment of the x-ray beam size and when directed automatically adjusts the length and width of the x-ray beam to desired dimensions. In this regard, the radiography controller 18 moves the test plate 17 in and out of an x-ray beam emitted from the x-ray source assembly 5.

When the test plate 17 is in its active position in the x-ray beam, the X-rays emitted from the x-ray source assembly 5 are directed at the test plate 17, and many of the X-rays in the x-ray beam pass through the test plate 17 and are incident on the patient 1. The X-rays passing through the patient 1 are imaged on the digital x-ray detector 4. A configuration of radiopaque fiducial markers in the test plate 17 determines the test image configuration that is detected by the digital x-ray detector 4. At a typical source-to-image detector distance (SID) the image of the test pattern is smaller (i.e., 15 cm×15 cm) than a 35 cm×43 cm or 43 cm×43 cm digital x-ray image detector 4.

In one embodiment, when test plate 17 is in its active position, the central ray passes through the center of the test plate 17 and the plane of the test plate 17 is orthogonal to the x-ray beam's central ray.

In examining the patient 1 with the mobile radiography system 2, an operator (not shown) moves the mobile radiography system 2 to the patient's bedside and positions the digital x-ray detector 4 and anti-scatter grid 3 beneath the patient's anatomy of interest. After positioning the x-ray source assembly 5 above the patient and visually (manually) aligning the x-ray source assembly 5 with the digital x-ray detector 4 and anti-scatter grid 3, the operator initiates imaging of the test pattern.

The radiography computing device 18 under operator control automatically moves the test plate 17 from a standby position (e.g., vertical position 17B, as shown by dotted line in FIG. 1) and centers the test plate 17 in the path of the x-ray beam emitted from the x-ray source assembly 5. The collimator 14 automatically adjusts the x-ray beam size to the test plate 17 and a high kV, low dose x-ray image of a pattern created by the test plate 17 and patient's anatomy of interest is captured and communicated wirelessly to the radiography computing device 18. Note that in another embodiment, the radiography computing device 18 may direct the operator to manually adjust the test plate 17 and adjust the collimator 14.

The radiography computing device 18 automatically moves or directs the operator to move the test plate 17 out of the x-ray beam (and back to its standby position) via the display device 19. Thereafter, a second high kV, lose dose x-ray image is captured of the patient's anatomy of interest by the digital x-ray detector 4 and communicated wirelessly to the radiography computing device 18. The radiography computing device 18 subtracts the second image from the first image leaving only the image of the test pattern (the "test pattern image") and removing the obfuscating effects of the patient's anatomy.

The radiography computing device 18 analyzes the test pattern image captured and determines the tilt of the plane of the digital x-ray detector 4, the plane of the anti-scatter grid 3, the location of the center of the digital x-ray detector 4, and the length and width orientation of the digital x-ray detector 4 relative to the location of and degrees of movement freedom of the x-ray focal spot.

The radiography computing device 18 communicates to the operator, e.g., via the display device 19, notice that the information has been communicated. Under operator control, the radiography computing device 18 automatically moves the x-ray focal spot so that it lies on the focal axis of the anti-scatter grid 3, and the central X-ray is centered on and orthogonal to the planes of the anti-scatter grid 3 and digital x-ray image detector 4.

Note that in one embodiment, the radiography computing device 18 directs the operator to manually move the articulated arm 20. The directions for moving the articulated arm 20 are provided such that movement of the articulated arm 20 aligns the x-ray focal spot so that it lies centrally on a focal axis of the anti-scatter grid 3.

The collimator 14 automatically collimates the x-ray beam to the active area of the digital x-ray detector 4. Note that the collimator 14 may also be collimated manually by the operator in other embodiments.

Further, the radiography computing device 18 moves and aligns each degree of the articulated arm 20 and locks each degree of freedom of the articulated arm 20 so that the x-ray focal spot of the x-ray source assembly 5 is in alignment with the anti-scatter grid focal axis and centered on the digital x-ray detector 4. When alignment of each of the degrees of freedom of the articulated arm 20 are achieved and the x-ray beam is centered on and collimated to the digital x-ray detector 4, the radiography computing device 18 notifies the operator, e.g., via the display device 19. Upon notification, the operator selects the x-ray techniques for the exam and patient's habitus and initiates the x-ray exposure. The digital x-ray detector 4 transmits data indicative of the resultant image data 36, obtained with a properly aligned high ratio grid and good scatter control, to the radiography computing device 18 for processing and display via the display device 19.

In one embodiment, the radiography computing device 18 directs the operator to sequentially move one or more degrees of freedom of the articulated arm 20 at a time and the motion of that degree of freedom is locked when its desired location is achieved. When the alignment of all the degrees of freedom have been achieved and the x-ray beam is centered on and collimated to the digital X-ray detector 4, an indication is given to the operator. The operator selects the x-ray techniques for the exam and patient's habitus and initiates the x-ray exposure. The resultant image, obtained with a properly aligned high ratio grid and good scatter control, is communicated wirelessly to the radiography computing device 18 for processing and display.

For a given digital x-ray detector 4 and anti-scatter grid 3, the patient's anatomy of interest and habitus determines the x-ray tube potential (kV) and mAs needed to obtain the desired x-ray detector radiation level. When the kV and mAs are selected by the operator, the desired x-ray detector radiation level is not always achieved. In one embodiment, the radiography computing device 18 may automatically select an appropriate kV and mAs when the x-ray focal spot and anti-scatter grid 3 are aligned for a desired digital x-ray detector radiation level using the patient's anatomy of interested selected by the operator and analysis of the test image.

Figure 2:
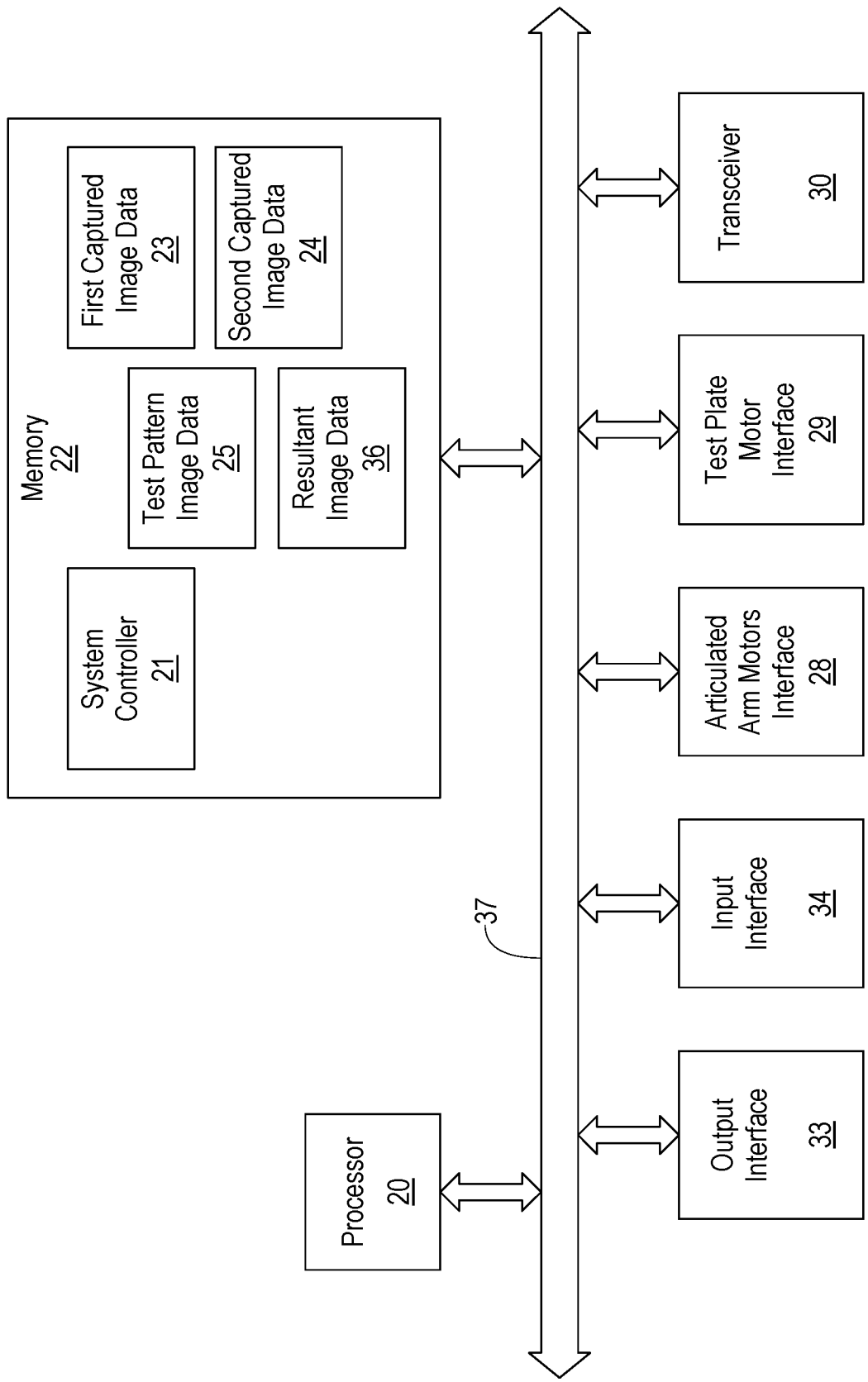
FIG. 2 is a block diagram of an exemplary radiography computing device as shown in FIG. 1.

FIG. 2 is a block diagram of an exemplary radiography computing device 18 in accordance with an embodiment of the present disclosure. The exemplary radiography computing device 18 comprises a processor 20 and memory 22. Stored in memory 22 is a system controller 21. The system controller 21 controls the functionality of the radiography system 2 (FIG. 1).

Note that the system controller 21, when implemented in software, is stored, and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the radiography computing device 18 depicted by FIG. 2 comprises at least one conventional processor 20, such as a digital signal processor (DSP) or a central processing unit (CPU), that communicates to and drives the other elements within the radiography computing device 18 via a local interface 37, which can include at least one bus. Further, the processor 20 is configured to execute instructions of software, such as instructions of the system controller 21.

An input interface 34, for example, a keyboard, a touchscreen, or keypad can be used to input data by an operator of the radiography system 2. An output interface 33, for example, a display device (e.g., a liquid crystal display (LCD)), can be used to output data indicative of information and images to the operator.

In addition, the radiography computing device 18 further comprises a transceiver 30. The transceiver 30 transmits and receives data wirelessly. In this regard, the transceiver receives data indicative of images captured by the digital x-ray detector 4 (FIG. 1). Further, during operation, first captured image data 23, second captured image data 24, test pattern image data 25, and resultant image data 36 are stored in memory 22.

The radiography computing device 18 further comprises an articulated arm motor(s) interface 28 for controlling movement of the articulated arm 20 (FIG. 1). The radiography computing device 18 further comprises a test plate motor interface 29, and the radiography computing device 18 controls movement of the test plate 17 via the test plate motor interface 29.

In one embodiment, the system controller 21 receives data indicative of a first image captured via the transceiver 30 from the digital x-ray detector 4 and stores the data received as first captured image data 23. The first captured image data 23 comprises data indicative of a test pattern image combined with data indicative of the patient's anatomy of interest. The second captured image data 24 comprises data indicative of only the patient's anatomy of interest.

Upon receipt of the first captured image data 23 and the second captured image data 24, the system controller 21 subtracts the second captured image data 24 from the first captured image data. 23 to obtain only the test pattern image data 25. The system controller 21 analyzes the test pattern image data 25 to determine the digital x-ray detector's pixel location of the x-ray beam, the tilt of the digital x-ray detector 4 (FIG. 1) and the planes of the anti-scatter grid 3 (FIG. 1) relative to the central x-ray.

Note that subtraction of the second captured image data 24 from the first captured image data 23 to obtain only the test pattern image data 25 is merely an exemplary method for obtaining the test pattern image data 25. Other methods may be used in other embodiments.

Note that in one embodiment, an increased amount of power of the X-rays may be used to generate a single image.

The radiography computing device 18 is further configured to determine the test pattern based upon the single image.

The radiography computing device 18 communicates to the operator, e.g., via the output interface 33, that the first captured image data 23 and the second captured image data 24 have been received. Under operator control, the radiography controller 18 automatically actuates the system controller 21, which in turn transmits signals to the motors (not shown) associated with each degree of freedom of the articulated arm 20 and moves the source assembly 5 so that x-ray focal spot lies on the focal axis of the anti-scatter grid 3 and the central X-ray is centered on and orthogonal to the planes of the anti-scatter grid 3 and digital x-ray detector 4.

The system controller 21 transmits a signal via a collimator interface 35 to restrict the x-ray beam to the active area of the digital x-ray detector 4. When alignment of each degree of freedom is achieved and the x-ray beam is centered on and collimated to the digital x-ray detector 4, the system controller 21 notifies the operator, e.g., via the output interface 33. Upon notification, the operator selects the x-ray techniques for the exam and patient's habitus and initiates the x-ray exposure via the input interface 34. Via the input interface 34, the operator selects x-ray techniques for the exam and patient's habitus. After selection, the operator initiates the x-ray exposure. The x-ray generator 23 produces current in the x-ray tube (not shown) of the x-ray source assembly 5. The X-rays produced by the x-ray source assembly 5 expose the digital x-ray detector 4 activating the digital x-ray detector 4 to transmit data indicative of the image to the radiography computing device 18. The radiography computing device 18 receives data indicative of the resultant image and stores the data received as resultant image data 36 in memory 22. The system controller 21 processes and displays the resultant image data 36 to the display device 19 via the output interface 33.

The resultant image, obtained with a properly aligned high ratio grid and good scatter control, is communicated wirelessly to the radiography controller 18 via the transceiver 30 for processing and display to the display device 19.

In one embodiment, the system controller 21 directs the operator to sequentially move one or more degree of motion freedom at a time and the motion of each degree of freedom is locked when its desired location is achieved. When the alignments of all the degrees of freedom have been achieved and the x-ray beam collimated to the digital x-ray detector 4, the system controller 21 notifies the operator via the output interface 33.

Figure 3:
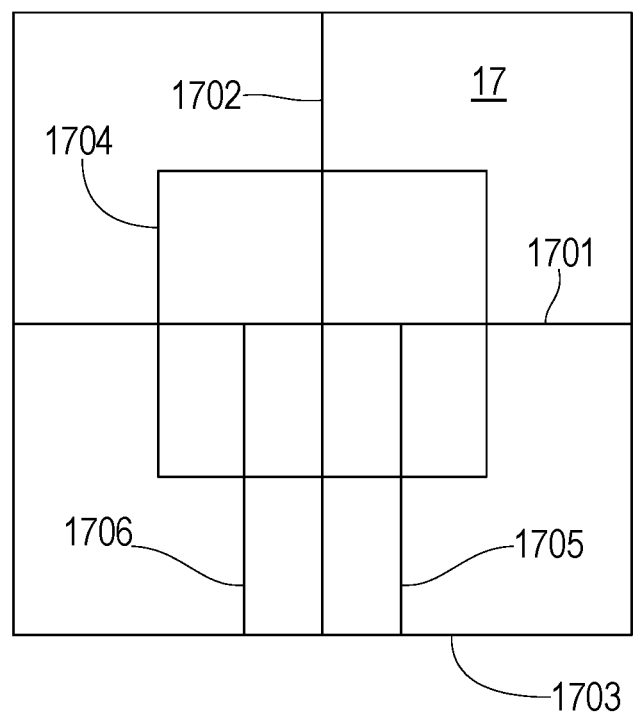
FIG. 3 is a diagram of an exemplary test plate as shown in FIG. 1 in accordance with an embodiment of the present disclosure.

FIG. 3 is a top view of exemplary fiducial radiopaque wire markers of test plate 17. Not shown is the radiolucent plastic support sheet the markers are embedded in. The radiopaque (e.g., tungsten) wires have a diameter of ≈3 mm. The fiducial radiopaque wire marker comprise wires 1701 and 1702, Wires 1701 and 1702 are orthogonal to one to the other and are bounded by a bounding square wire 1703. The sides of the bounding squire wire 1703 have sides parallel to either wire 1701 or 1702, and its center is located where wires 1701 and 1702 cross. Further, the test plate 17 comprises a smaller wire square 1704 also centered where wires 1701 and 1702 cross with its sides parallel to and ½ the length of the sides of wire square 1703. Wires 1705 and 1706 are located parallel to the wire 1702 and extend from wire 170 to a side of the wire square 1703. The wires 1705 and 1706 allow the front of the test pattern to be distinguished from its sides and back.

In one embodiment, the dimensions of the large square are on the order of 4 cm×4 cm. When the test plate 17 is positioned in the collimator 14 (FIG. 1) for imaging at a known distance from the x-ray focal spot, the central ray passes through the crossing of wires 1701 and 1702, wire 1701 is parallel to the cathode-anode axis 27, and the front of the pattern is parallel to the front of the x-ray source assembly 5 and collimator 14.

In one embodiment, the exemplary test plate 17 comprises a pattern of fiducial markers embedded in a thin radiolucent plastic sheet. The fiducial markers 1706 may be wires made of a radiopaque material, e.g., tungsten.

However, other fiducial markers may be used in other embodiments. The fiducial marker pattern is arranged so that the front of the source assembly 5 (FIG. 1) and collimator 14 (FIG. 1) can be determined from the test plate image relative to the digital x-ray detector 4 (FIG. 1). Other fiducial marker patterns may be used in other embodiments.

Thus, in operation, when X-rays strike the test plate 17, the area of the fiducial markers is small compared to the area of radiolucent plastic and a majority of the X-rays (e.g., 90%) go through the radiolucent plastic support sheet while the fiducial markers 1701-1706 block only a very small fraction of the X-rays. Thus, an image is detected by the digital x-ray detector 4 (FIG. 1) based upon the X-rays that are allowed to pass through the test plate 17.

Note that in one embodiment, the test plate 17 may be configured differently. In this regard, the test plate 17 may have geometric or other types of patterns that block a majority of the X-rays and pass a minority of the X-rays.

Figure 4:
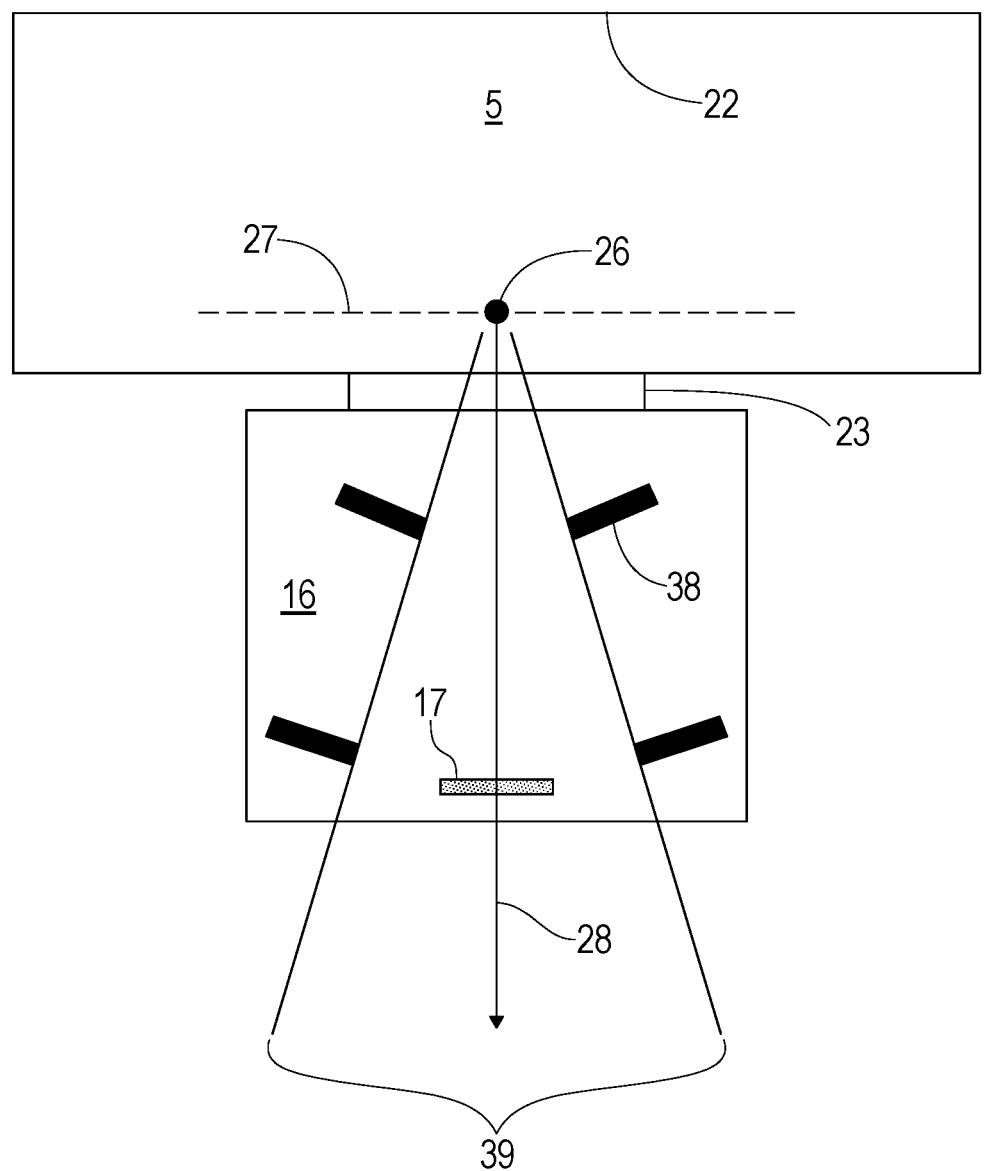
FIG. 4 is a diagram of an exemplary x-ray source assembly and an exemplary collimator as shown in FIG. 1.

FIG. 4 is an exemplary x-ray source assembly 5 and collimator 14 in accordance with an embodiment of the present disclosure. The exemplary x-ray source assembly 5 inherently has a focal spot 26.

The x-ray source assembly 5 is comprised of housing 22, collimator mounting plate 23, and x-ray tube and associated components (not shown) for performing an x-ray exposure. The housing 22 and housing mounting plate 23 are radiopaque except for a radiolucent window in the housing 22 and mounting plate (not shown) through which the X-rays pass. Coupled to the mounting plate 23 is the collimator 14. The collimator 14 is comprised of a housing 16 and movable radiopaque blades 38. The top of the housing 16 has openings (not shown) through which the x-ray beam passes and for coupling the collimator 14 to the collimator mounting plate 23. The remainder of the top of housing 16 is radiopaque and its sides are radiopaque. A bottom of the collimator housing 16 is radiolucent. The movable radiopaque blades 38 spatially restrict and define the span of the x-ray beam 39 in two dimensions emitted by the x-ray source assembly 5 and is incident on the patient 1 (FIG. 1) and digital x-ray detector 4. The radiopaque blades 38 can be moved manually or automatically. Moveably coupled in the collimator 14 is the test plate 17.

The x-ray tube has a cathode (not shown), anode (not shown), and the focal spot 26. The focal spot 26 is the small area on the anode where X-rays originate. The x-ray source assembly's cathode-anode axis 27 is a line parallel to the plane of the mounting plate that passes through the cathode, anode, and focal spot 26. The central ray 28 of the x-ray beam is the line that passes through the focal spot 26 and is perpendicular to the plane of the mounting plate 23 and to the cathode-anode axis 27. In one embodiment the collimator 14 and spatially defined x-ray beam 39 can rotate about the central ray 28.

The x-ray collimator 14 comprises the moveable test plate 17. As described herein, the test plate 17 may be moved to a position such that X-rays emitted from the x-ray source assembly 5 are emanated through the test plate 17. When the test plate 17 is not being used, e.g., when capturing data indicative of the anatomy of interest only, radiography computing device 18 (FIG. 1) moves the test plate 17 to a position 17B (FIG. 1) such that the X-rays do not emanate through the test plate 17.

In operation, the x-ray source assembly 5 emits X-rays. The X-rays enter the collimator 14. The radiopaque blades 38 adjust the X-rays down to the size of the digital x-ray detector 4 (FIG. 1).

Figure 5:
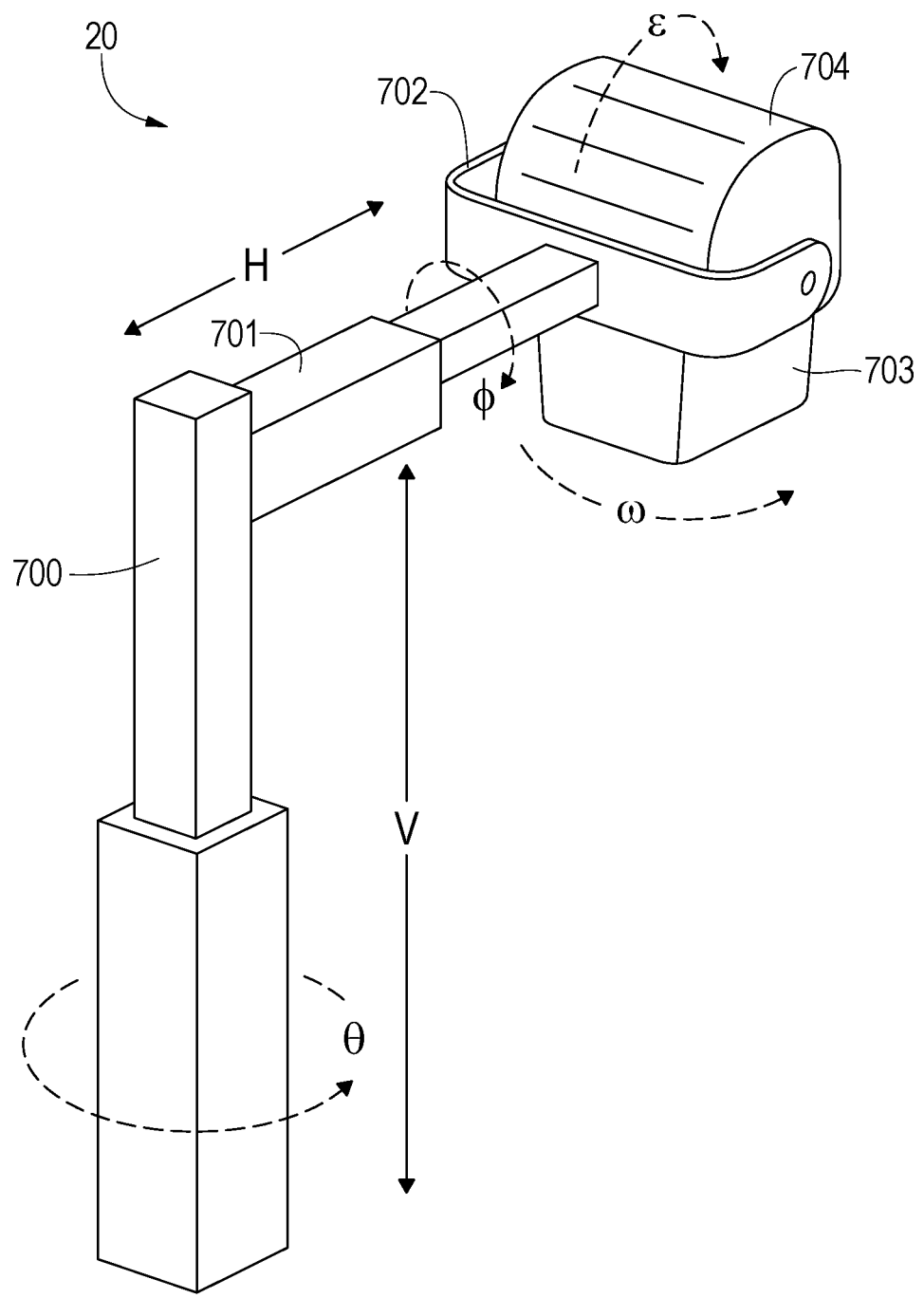
FIG. 5 is an exemplary articulated arm as shown in FIG. 1 in accordance with an embodiment of the present disclosure.

FIG. 5 is an exemplary articulating arm 20 in accordance with an embodiment of the present disclosure. The articulating arm 20 comprises a rotating vertical column 700. In this regard, the system controller 21 (FIG. 2) is configured to transmit signals to the articulating arm motor(s) (not shown) via the articulating arm motor(s) interface 28 (FIG. 2) to move the x-ray source assembly 704 vertically "V" and rotate the vertical column (and x-ray source assembly 704) about angle θ.

Further, the articulating arm 20 comprises a horizontal arm 701. In this regard, the system controller 21 is configured to transmit signals to the articulating arm motor(s) (not shown) via the articulating arm motor(s) interface 28 (FIG. 2) to move the horizontal arm 701 and the x-ray source assembly 704 horizontally "H."

A gimbal 702 is rotatably coupled to the horizontal arm 701 via a bracket (not shown) that allows angle ϕ rotation of gimbal 13 (and x-ray source assembly 704) about the axis of the horizontal arm (not shown) and allows angle ω rotation of the gimbal 13 (and x-ray source assembly 704) about an axis parallel to a central ran (not shown) exiting the x-ray source assembly 704. In this regard, the system controller 21 is configured to transmit signals to the articulating arm motor(s) (not shown) via the articulating arm motor(s) interface 28 (FIG. 2) to rotate the gimbal 702 about angles ϕ and ω.

The x-ray source assembly 704 is rotatable coupled to the gimbal 702 such that the x-ray source assembly 701 can rotate about angle ε about an x-ray tube cathode-anode axis. In this regard, the system controller 21 is configured to transmit signals to the articulating arm motor(s) (not shown) via the articulating arm motor(s) interface 28 (FIG. 2) to rotate the x-ray source assembly 704 about angle ε.

In one embodiment, the gimbal 702 is rotatably coupled to the horizontal arm 701 via a bracket (not shown) that allows angle ϕ rotation of the gimbal 702 (and x-ray source assembly 704 about the axis of the horizontal arm (not shown), and the collimator 14 is rotatably coupled to the x-ray source assembly 704 allowing angle ω rotation of the collimator 14 about the central ray (not shown). In this embodiment, the system controller 21 is configured to transmit signals to the articulating arm motor(s) (not shown) via the articulating arm motor(s) interface 28 (FIG. 2) to rotate gimbal 13 about angle ϕ and the collimator 14 about ω.

Note that as described above, the horizontal arm 701 and the vertical column 700 are telescoping. In this regard, the system controller 21 is configured to transmit signals to the articulating arm motor(s) (not shown) via the articulating arm motor(s) interface 28 (FIG. 2) to move the vertical column 700 in the "V" direction and the horizontal arm 701 in the "H" direction.

Figure 6:
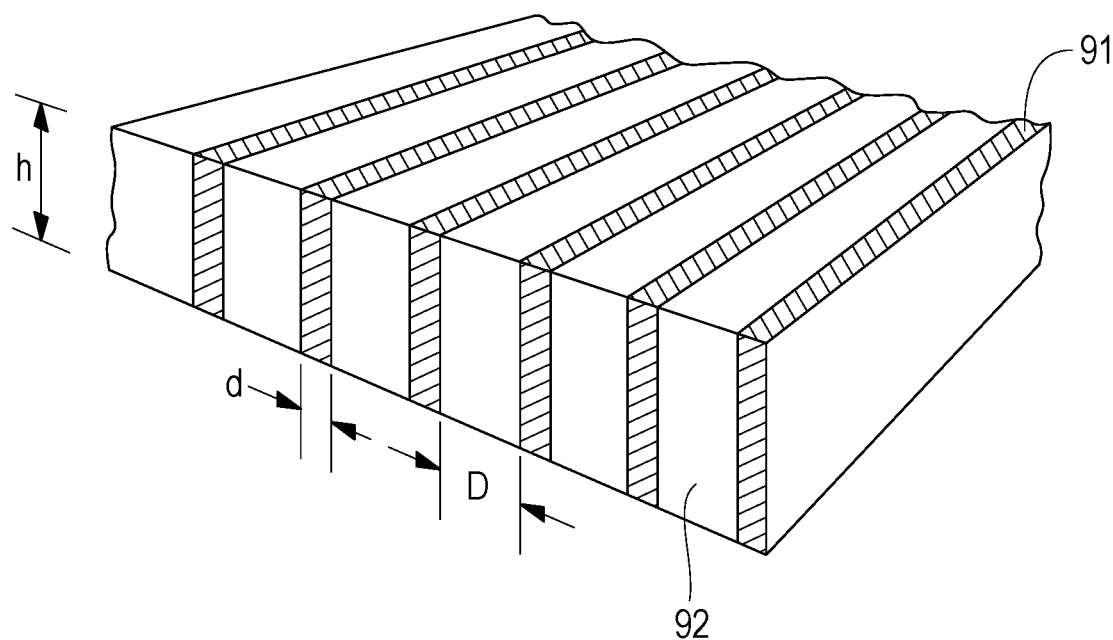
FIG. 6 is a diagram of a portion of an anti-scatter grid as shown in FIG. 1.

FIG. 6 is a diagram of a portion of an anti-scatter grid 3 (FIG. 1). The anti-scatter grid 3 comprises a plurality of radiopaque strips 91. The radiopaque strips 91 are often made of lead, which prevents X-rays from propagating through the lead strips 91.

The anti-scatter grid 3 further comprises a plurality of radiolucent interspace material 92 interposed between each lead strip 91. The radiolucent interspace material 92 is permeable by X-rays. In this regard, the radiolucent interspace material 92 does not block the X-rays and allows a majority of the X-rays to pass.

The grid ratio (h/D) is the ratio of the height of the lead strips 91 (h) to the distance (D) between them. The grid ratio (h/D) affects the scatter control efficiency of the grid. In this regard, the higher grid ratio anti-scatter grid 3 reduces the scatter content and enhances the contrast of the x-ray image produced compared to an image produced with a low ratio grid.

Figure 7:
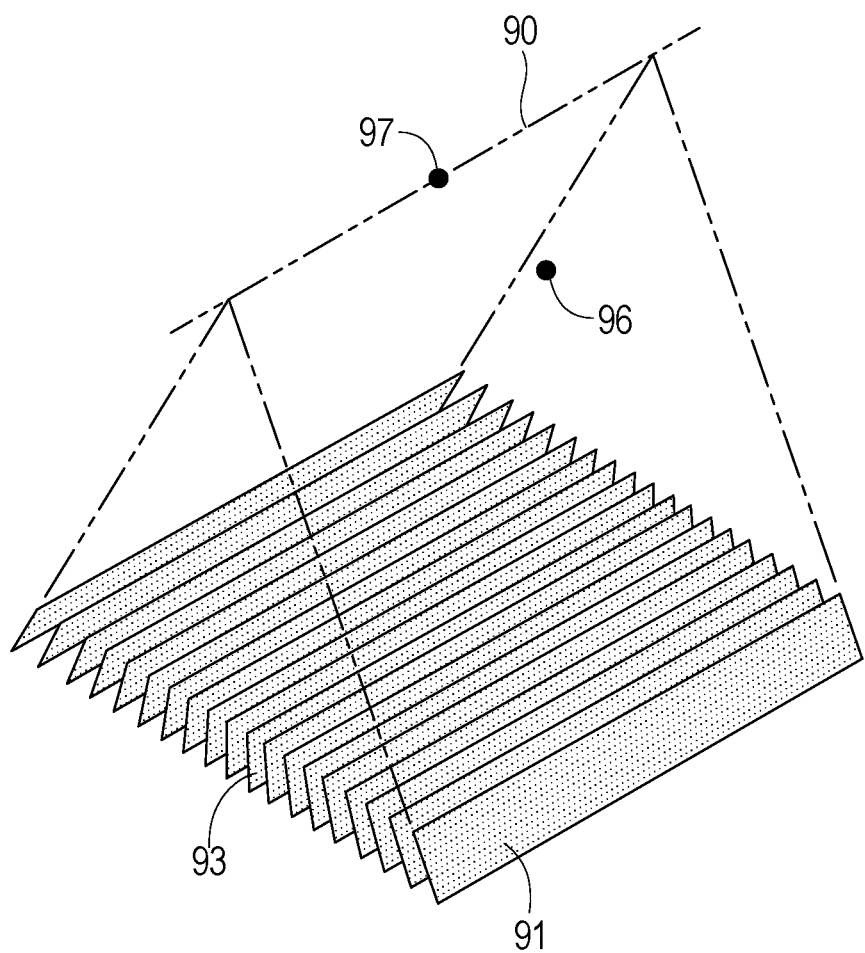
FIG. 7 is a diagram of a plurality of exemplary lead plates of an anti-scatter grid, as shown in FIG. 1, and corresponding focal axis showing misalignment and alignment of a focal spot of an x-ray source assembly with the focal axis of the anti-scatter grid.

FIG. 7 is a diagram of a plurality of lead strips 91 making up a portion of the anti-scatter grid 3 (FIG. 1). The lead strips 91 are arranged such that each lead strip is angled inward toward the central lead strip 93, and the lead strips 91 of the anti-scatter grid 3 have a focal axis 90. FIG. 7 shows the x-ray tube focal spot 26 (FIG. 4) in position 96 and misaligned with and not on the focal axis 90 of the anti-scatter grid 3. When misalignment occurs, the primary X-rays see a greater area than just the edges of the lead strips 91, and the fraction of primary X-rays that pass through the anti-scatter grid 3 is decreased. Thus, a less effective image is detected by the digital image x-ray detector 4 than when the focal spot 26 is aligned with the focal axis 90 of the anti-scatter grid 3.

In FIG. 7 the centrally aligned focal spot anti-scatter grid position is denoted by 97. When the x-ray tube focal spot 26 (FIG. 4) is at position 97 it lies on a focal axis 90 of the anti-scatter grid 3 and is aligned with the anti-scatter grid 3. Further, the x-ray beam is centered on the x-ray image detector 4 (FIG. 4). A central X-ray (not shown) is orthogonal to the planes of the anti-scatter grid 3 and digital x-ray detector 4. The resultant image produced by exposure to the digital x-ray detector 4 better reflects the anatomy of interest of the patient 1 (FIG. 1) than when the focal spot 26 is not aligned with the anti-scatter grid 3.

Figure 8:
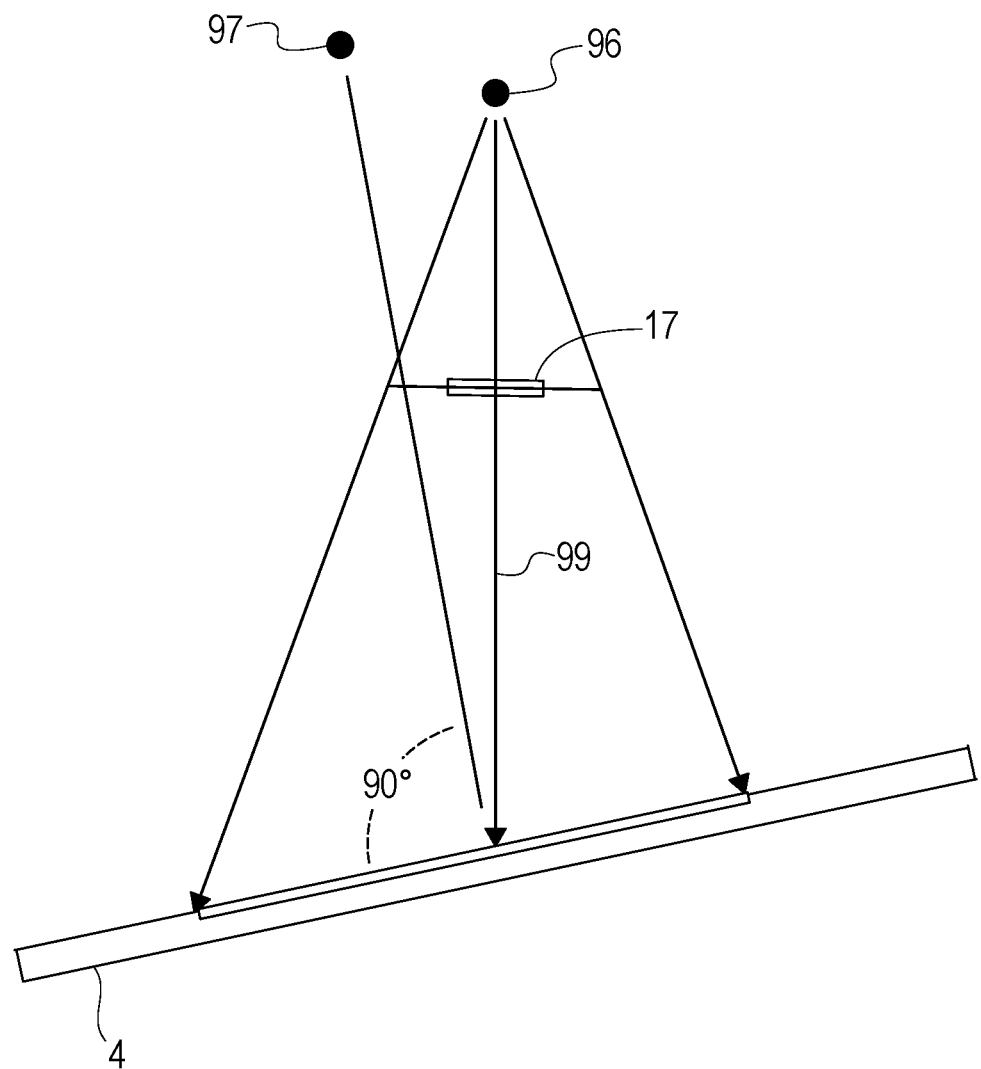
FIG. 8 is a diagram of an exemplary test plate as shown in FIG. 1 and a focal spot of the x-ray source assembly in a misaligned position and an aligned position.

FIG. 8 is a diagram depicting the method whereby the system controller 21 aligns the x-ray source assembly focal spot with the anti-scatter grid focal axis 90. In this regard, an X-ray is initiated through the test plate 17. The lead wires in the test plate 17 produce a first image of a test pattern combined with an image of the anatomy of interest. Another X-ray is initiated without use of the test plate 17 to obtain a second image. The system controller 21 subtracts the second image from the first image to obtain the test image. Based upon the location of the fiducial markers in the test image, the system controller 21 determines the orientation of the anti-scatter grid 3 and digital x-ray detector 4 relative to the movable x-ray source assembly focal spot 26. When the x-ray focal spot 26 is moved from the misaligned position 96 to position 97 and aligned, it lies on the focal axis of the grid 90 and the central X-ray is orthogonal to the plane of the anti-scatter grid 3 and orthogonal to the plane of and centered on the digital x-ray detector 4.

Figure 9:
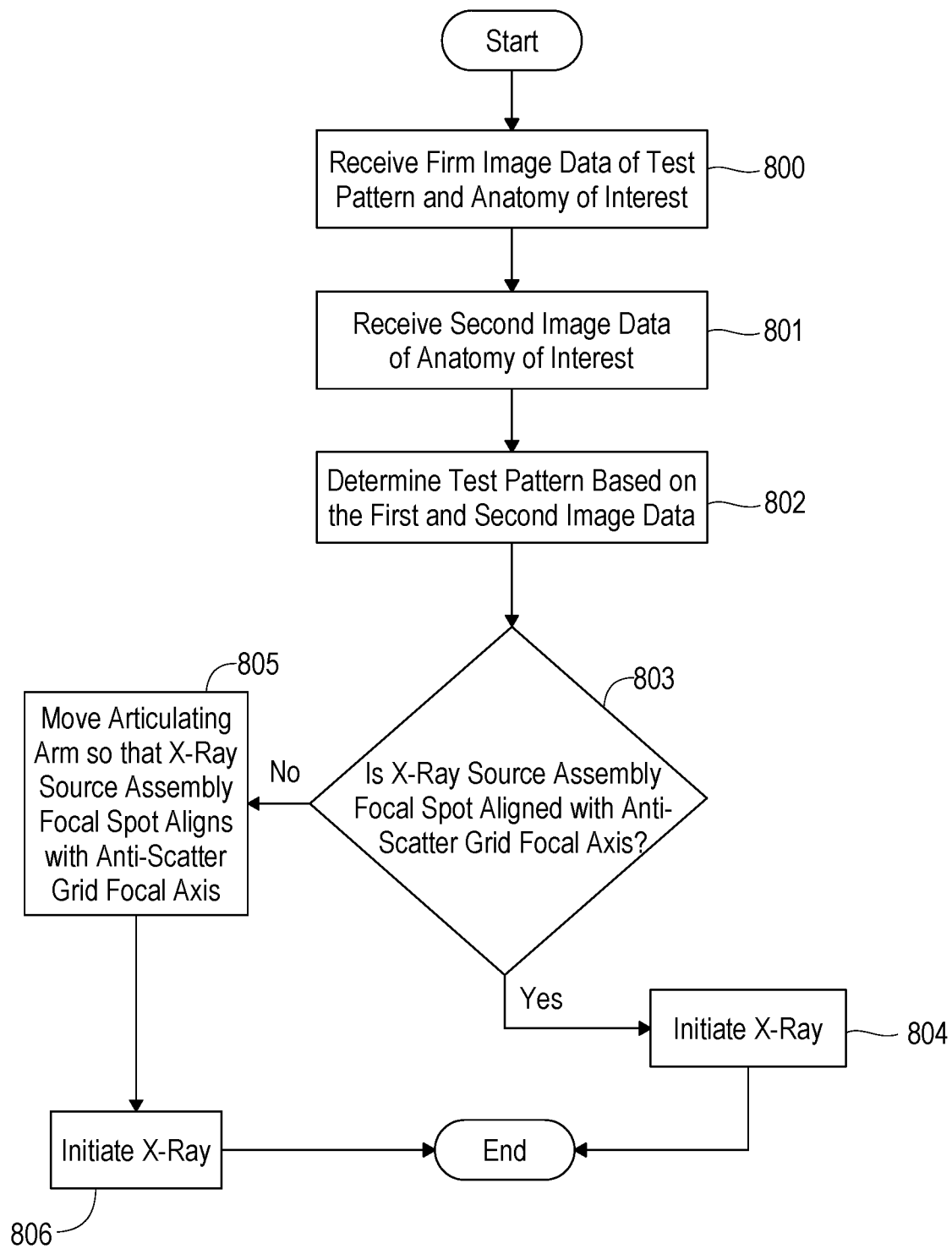
FIG. 9 is a flowchart depicting exemplary architecture and functionality of the radiography system as shown in FIG. 1.

FIG. 9 is a flowchart of exemplary architecture and functionality of the mobile radiography system 2 (FIG. 1).

In step 800, the system controller 21 receives the first image indicative of the test pattern and the anatomy of interest. In step 801, the system controller 21 receives the second image indicative of only the anatomy of interest.

In step 802, the system controller 21 determines the test pattern image based on the first image and the second image. The system controller 21 analyzes the test image and determines the position of the x-ray focal spot 26 relative to the centrally aligned focal spot-grid position 97 (FIG. 7). If the x-ray focal spot at position 96 (FIG. 7) and misaligned, the system controller 21 determines the movement of the articulated arm 20 (FIG. 1) for locating the x-ray focal spot at the centrally aligned position 97.

In step 803, the system controller 21 determines whether the x-ray source assembly focal spot 26 is at position 97 and is aligned with the anti-scatter grid focal axis 90. If they are aligned, the system controller 21 informs the operator to initiate an X-ray of the patient 1 (FIG. 1) in step 804. If the x-ray focal spot at position 96 (FIG. 7) is misaligned, the system controller 21 informs the operator.

When the x-ray focal spot and grid are misaligned under operator control in step 805, the system controller 21 moves the x-ray focal spot from misaligned position 96 (FIG. 7) and to centrally aligned position 97 (FIG. 7). When the x-ray focal spot is in position 97 the operator is informed to initiate an X-ray of the patient 1 (FIG. 1) in step 806.

When the kV and mAs for the anatomy of interest is selected by the operator, the radiation level at the image detector is often less or more than the appropriate level. In one embodiment, using the anatomy of interest selected by the operator and the information in the test image (or images), the system controller 21 determines the kV and mAs to achieve an appropriate radiation level at the x-ray detector.

Figure 10:
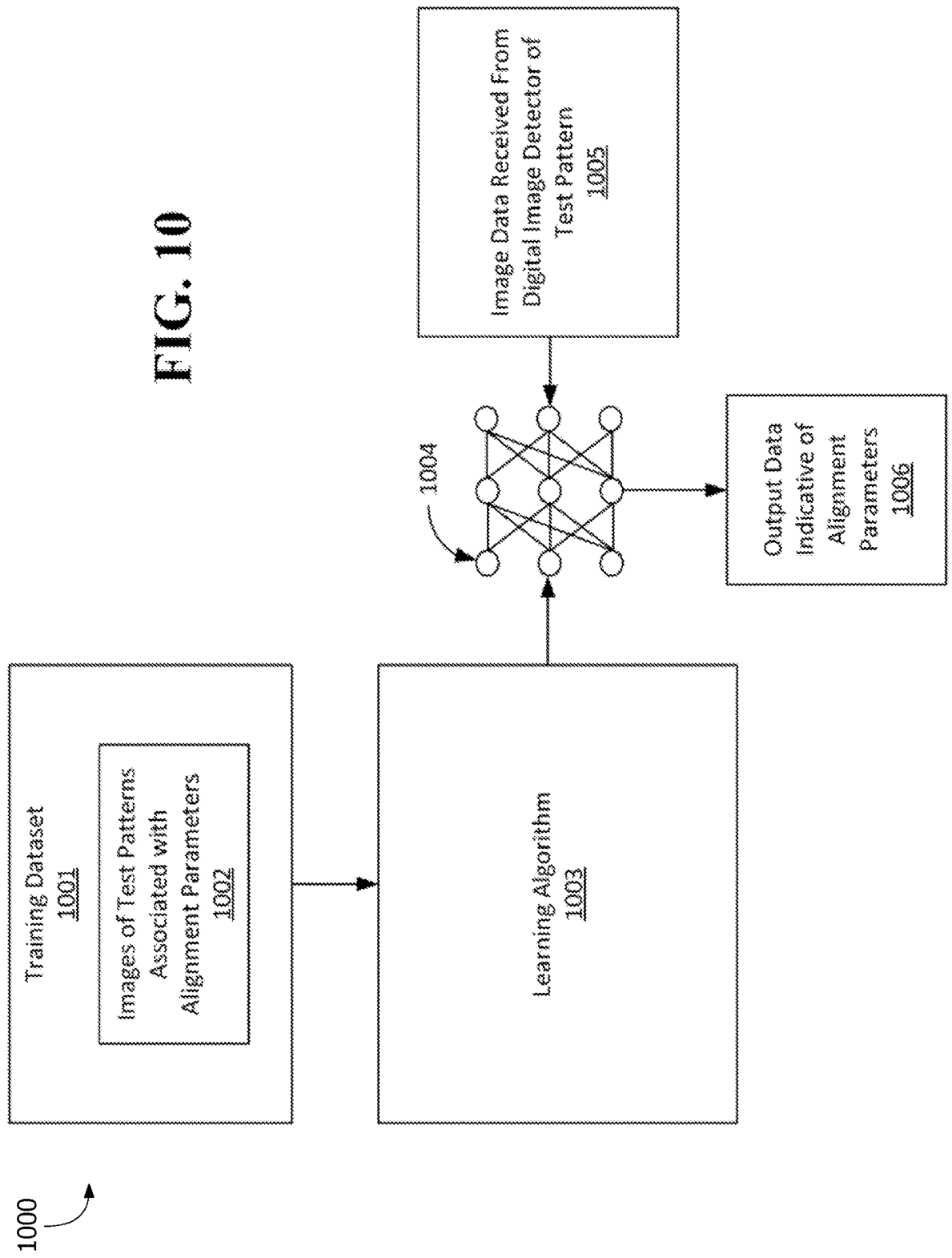
FIG. 10 is a block diagram of an artificial intelligence system in accordance with an embodiment of the present disclosure.

FIG. 10 is a block diagram of an exemplary artificial intelligence implementation 1000 for use in the radiography computing device 18 in accordance with an embodiment of the present disclosure. In this regard, the radiography computing device 18 may used ai-based image recognition to identify test images and determine orientation of the x-ray source assembly 5 (FIG. 1) relative to the digital x-ray detector 4 (FIG. 1).

The radiography computing device 18 having an artificial intelligence implementation will be trained using a dataset 1001. Training the radiography computing device 18 is teaching the radiography computing device 18 to properly interpret input images from the digital x-ray detector 4 (FIG. 1) and determine orientation so that the x-ray source assembly 5 may be aligned with the focal axis of the anti-scatter grid 3.

The dataset 1001 may comprise images of test patterns and associated with the images metadata that includes orientation parameters 1002. The radiography computing device 18 may be trained via machine learning. In one embodiment, the machine learning is supervised learning in which the radiography computing device 18 builds a model via a machine learning algorithm 1003. In this regard, the radiography computing device 18 uses the image and parameter data 1002 to find a model that minimizes incorrect outcomes, i.e., analyzing an input image and incorrectly determining the orientation of the digital x-ray detector 4 in relation to the x-ray source assembly 5.

A model 1004 is generated by using the learning algorithm 1003. The model 1004, when used during operation of the radiography computing device 18, analyzes datasets (i.e., input images) to find patterns and predict the orientation of the x-ray source assembly 5 relative to the digital x-ray detector 4. Based upon the orientation predicted, the radiography computing device 18 determines how to move the x-ray source assembly 5 to align the focal array of the anti-scatter grid 3 with the x-ray source assembly 5.

Note that there are image recognition algorithms that may be used to generate the model 1004 by the radiography computing device 18. For example, SIFT (scale-invariant feature transform), SURF (speeded up robust features), PCA (Principal component analysis), and LDA (linear discriminant analysis). Note that these algorithms are exemplary, and other algorithms may be used in other embodiments.

Note that there are models that may be used in an embodiment of the radiography computing device 18 for image classification. For example, the model 1004 may be a VOLOv5 model, Vision Transformer model or Resnet34 model. Other models may be used in other embodiments. Also, convolutional neural networks (CNNs) may be used as the model 1004.

In operation, an image captured by the digital x-ray detector 4 is input into the model 1004. Based upon the input, the model 1004 outputs data indicative of alignment parameters. Thus, the radiography computing device 18 may use the alignment parameters 1006 to determine the direction and/or angles to move each of the degrees of freedom of the articulated arm 20 to centrally align the focal spot 26 (FIG. 4) of the of the x-ray source assembly 5 (FIG. 1) with the focal axis 90 (FIG. 7) of the anti-scatter grid 3 and collimate the spatial extent (length and width) of the x-ray beam to the digital x-ray detector 4.

What I claim is:

1. A mobile radiography system, comprising:
   an x-ray source assembly configured to activate a digital x-ray detector through X-rays striking the digital x-ray detector;
   a test plate in a stream of the X-rays configured to image a test pattern onto the digital x-ray detector;
   a processor configured to receive data indicative of the test pattern and the anatomy of interest and generate a first image indicative of the test pattern and the anatomy of interest, the processor further configured for analyzing the first image and determining if a focal spot of the x-ray source assembly is aligned with a focal axis of an anti-scatter grid and the digital x-ray detector, and when the focal spot of the x-ray source assembly is misaligned with the focal axis of the anti-scatter grid and center of the digital x-ray detector, the processor further configured for aligning the focal spot of the x-ray source assembly with the focal axis of the anti-scatter grid and the center of the digital x-ray detector or the processor is further configured for providing instructions to an operator for manually aligning the focal spot of the x-ray source assembly with the focal axis of the anti-scatter grid and the center of the digital x-ray detector.

2. The mobile radiography system of claim 1, wherein the processor is further configured for actuating an articulating arm to align the x-ray source assembly focal spot with the focal axis of the anti-scatter grid and the digital x-ray detector.

3. The mobile radiography system of claim 1, wherein the processor is further configured for automatically locking at least one degree of freedom when the at least one degree of freedom is aligned upon manual movement of the operator of the articulating arm as instructed by the processor.

4. The mobile radiography system of claim 1, wherein the processor is further configured for receiving a data indicative of the anatomy of interest and generate a second image of the data indicative of the anatomy of interest.

5. The mobile radiography system of claim 4, wherein the processor is further configured to for determining the test pattern by subtracting the second image from the first image.

6. The mobile radiography system of claim 1, further comprising a collimator, wherein the processor is further configured for automatically adjusting a collimator between the x-ray source assembly and the digital x-ray detector to define the spatial extent of the first and second image.

7. The mobile radiography system of claim 1, further comprising a collimator, wherein the collimator is configured for manual adjustment of the collimator between the x-ray source assembly and the digital x-ray, and wherein the processor is further configured for directing the operator to manually define the spatial extent of the first and second image.

8. The mobile radiography system of claim 1, wherein the test plate is a radiolucent plate comprising one or more fiducial markers.

9. The mobile radiography system of claim 8, wherein the radiolucent plate is plastic.

10. The mobile radiography system of claim 8, wherein the fiducial markers are radiopaque wire within the radiolucent plate.

11. The mobile radiography system of claim 10, wherein the fiducial markers comprise at least a first square wire within the radiolucent plate.

12. The mobile radiography system of claim 10, wherein the fiducial markers further comprise a second square wire within the first square wire within the radiolucent plate.

13. The mobile radiography system of claim 10, wherein the fiducial markers further comprise two orthogonal wires extending to the sides of the first square bounding wire.

14. The mobile radiography system of claim 10, wherein the fiducial markers further comprise a wire parallel to a portion of one of the orthogonal wires extending from the other orthogonal wire to the first square and a second wire parallel to the other side of the portion of the orthogonal wire extending from the other orthogonal wire to the first square.

15. The mobile radiography system of claim 10, wherein the parallel wires are embedded in a front portion of the radiolucent plate.

16. The mobile radiography system of claim 1, wherein the processor is further configured for automatically selecting an x-ray tube potential (kV) for the type of exam based on the first image.

17. The mobile radiography system of claim 1, wherein the processor is further configured for automatically selecting an x-ray tube current-exposure time product based on the first image.

18. The mobile radiography system of claim 1, wherein the collimator houses the test plate, and the processor is further configured for automatically moving the test plate from a standby position to an active position so that the test plate is in the stream of the X-rays.

19. The mobile radiography system of claim 1, wherein the collimator houses the test plate, and the processor is further configured for directing the operator to manually move the test plate from a standby position to an active position so that the test plate is in the stream of the X-rays.

20. A mobile radiography method, comprising:
　activating, by an x-ray source assembly, a digital x-ray detector through striking the digital x-ray detector with X-rays;
　imaging, by a test plate in a stream of the X-rays, a test pattern on the digital x-ray detector;
　receiving, by a processor, data indicative of the test pattern and an anatomy of interest;
　generating, by a processor, a first image from the data indicative of the test pattern and the anatomy of interest;
　analyzing, by a processor, the first image;
　determining, by a processor, if a focal spot of the x-ray source assembly is aligned with a focal axis of an anti-scatter grid and the digital x-ray detector; and
　aligning, by a processor, the focal spot of the x-ray source assembly with the focal axis of the anti-scatter grid and the center of the digital x-ray detector or the processor is further configured for providing instructions to an operator for manually aligning the focal spot of the x-ray source assembly with the focal axis of the anti-scatter grid and the center of the digital x-ray detector when the focal spot of the x-ray source assembly is misaligned with the focal axis of the anti-scatter grid and center of the digital x-ray detector.

21. The mobile radiography method of claim 20, further comprising automatically actuating an articulating arm to align the x-ray source assembly focal spot with the focal axis of the anti-scatter grid, if the focal spot of the x-ray source assembly focal spot is misaligned with the focal axis of the anti-scatter grid.

22. The mobile radiography method of claim 20, further comprising automatically locking, by the processor, at least one degree of freedom upon manual movement of the operator of the articulating arm as instructed by the processor.

23. The mobile radiography method of claim 20, further comprising receiving, by the processor, data indicative of the anatomy of interest.

24. The mobile radiography method of claim 23, further comprising generating, by the processor, a second image based upon the data indicative of the anatomy of interest.

25. The mobile radiography method of claim 24, wherein the determining further comprises subtracting the second image from the first image.

26. The mobile radiography method of claim 20, further comprising actuating a collimator positioned between the x-ray source assembly and the digital x-ray detector to define a spatial extent of the first and second image.

27. The mobile radiography method of claim 20, further comprising manually positioning a collimator between the x-ray source assembly and the digital x-ray detector to define a spatial extent of the first and second image.

28. The mobile radiography method of claim 20, further comprising imaging, by the test plate in the stream of the X-rays, the text pattern on the digital x-ray detector, wherein the radiolucent plate is plastic.

29. The mobile radiography method of claim 20, further comprising imaging, by the test plate in the stream of the X-rays, the test pattern on the digital x-ray detector, wherein the test plate is radiolucent, and the test plate comprises one or more fiducial markers.

30. The mobile radiography method of claim 29, further comprising imaging, by the test plate in the stream of the X-rays, the test pattern on the digital x-ray detector, wherein the fiducial markers are lead wires embedded on the radiolucent plate.

31. The mobile radiography method of claim 29, further comprising imaging, by the test plate in the stream of the X-rays, the test pattern on the digital x-ray detector, wherein the fiducial markers comprise at least a square bounding wire in the radiolucent plate.

32. The mobile radiography method of claim 29, further comprising imaging, by the test plate in the stream of the X-rays, the test pattern on the digital x-ray detector, wherein the fiducial markers further comprise two orthogonal wires extending to the sides of the square bounding wire.

33. The mobile radiography method of claim 28, further comprising imaging, by the test plate in the stream of the X-rays, the test pattern on the digital x-ray detector, wherein the fiducial markers further comprise a first wire on a left side of a portion of one of the orthogonal wires and a second wire on a right side of the same portion of the orthogonal wires.

34. The mobile radiography system of claim 33, further comprising imaging, by the test plate in the stream of the X-rays, the test pattern on the digital x-ray detector, wherein the horizontal wire is embedded on a front portion of the radiolucent plate.

35. The mobile radiography method of claim 20, further comprising automatically selecting, by the processor, an x-ray tube potential (kV) for the type of exam.

36. The mobile radiography method of claim 20, further comprising automatically selecting, by the processor, an x-ray tube current-exposure time product.

37. The mobile radiography method of claim 20, wherein the test plate is housed in a collimator, further comprising automatically moving the test plate from a standby position to an active position so that the test plate is in the stream of the X-rays.

38. The mobile radiography system of claim 20, wherein the test plate is housed in a collimator, further comprising directing the operator to manually move the test plate from a standby position to an active position so that the test plate is in the stream of the X-rays.

* * * * *